United States Patent [19]

Kirkwood

[11] Patent Number: 5,070,974
[45] Date of Patent: Dec. 10, 1991

[54] HYDRAULIC TORSIONAL VIBRATION DAMPER

[75] Inventor: Malcolm E. Kirkwood, Livonia, Mich.

[73] Assignee: Borg-Warner Automotive Transmission & Engine Components Corporation, Sterling Heights, Mich.

[21] Appl. No.: 585,414

[22] Filed: Sep. 19, 1990

[51] Int. Cl.⁵ .......................... F16H 45/02; F16D 3/80
[52] U.S. Cl. .................................... 192/3.3; 192/3.29; 192/106.1; 464/24
[58] Field of Search ..................... 192/3.28, 3.29, 3.3, 192/30 V, 106.1; 464/24, 28

[56] References Cited

U.S. PATENT DOCUMENTS

| | | | |
|---|---|---|---|
| Re. 32,705 | 6/1988 | Lamarche | 464/68 |
| 3,653,228 | 4/1972 | Tiberio | 464/24 |
| 4,139,995 | 2/1979 | Lamarche | 192/106.2 X |
| 4,188,805 | 2/1980 | Fall et al. | 192/106.1 X |
| 4,188,806 | 2/1980 | Fall et al. | 192/106.1 X |
| 4,232,534 | 11/1980 | Lamarche | 192/106.2 X |
| 4,279,132 | 7/1981 | Lamarch | 192/106.2 X |
| 4,302,951 | 12/1981 | Fall et al. | 192/106.1 X |
| 4,304,107 | 12/1981 | Fall et al. | 192/106.1 X |
| 4,317,510 | 3/1982 | Staub, Jr. | 192/3.29 X |
| 4,333,552 | 6/1982 | LaMarche | 192/3.29 |
| 4,347,717 | 9/1982 | Lamarche | 464/64 |
| 4,360,352 | 11/1982 | Lamarche | 464/64 |
| 4,413,711 | 11/1983 | Lamarche | 192/3.28 |
| 4,423,803 | 1/1984 | Malloy | 192/3.29 |
| 4,427,400 | 1/1984 | Lamarche | 464/64 |
| 4,430,064 | 2/1984 | Lamarche | 464/64 |
| 4,451,244 | 5/1984 | Lamarche | 464/68 |
| 4,466,518 | 8/1984 | Mueller | 192/3.29 |
| 4,530,673 | 7/1985 | Lamarche | 464/64 |
| 4,555,008 | 11/1985 | Nagano | 192/106.1 |
| 4,555,009 | 11/1985 | Habel et al. | 192/106.2 |
| 4,585,427 | 4/1986 | Lamarche | 464/67 |
| 4,679,678 | 7/1987 | Habel, Jr. et al. | 192/106.2 |
| 4,690,256 | 9/1987 | Bopp et al. | 192/3.28 X |
| 4,702,721 | 10/1987 | Lamarche | 464/67 |
| 4,775,042 | 10/1988 | Kohro et al. | 192/106.1 X |

FOREIGN PATENT DOCUMENTS

| | | | |
|---|---|---|---|
| 3343940 | 6/1985 | Fed. Rep. of Germany | 464/24 |
| 3742794 | 6/1989 | Fed. Rep. of Germany | 464/24 |
| 2626337 | 7/1989 | France | 192/30 V |
| 56-156526 | 12/1981 | Japan | 192/30 V |
| 63-67462 | 3/1988 | Japan | 192/3.3 |

Primary Examiner—Richard Lorence
Attorney, Agent, or Firm—Reising, Ethington, Barnard, Perry & Milton

[57] ABSTRACT

A torsion damper (10) for damping vibration between the input member and output member of a hydrodynamic converter (12) includes a lock-up plate (30) which is axially moveable in response to differential hydraulic pressure thereacross to be directly coupled to or released from the input member; a variable volume liquid filled damping chamber (62) is connected to the inboard surface of the lock-up plate and is comprised of three separate, slidably supported rings (40) for forming part of the damping chamber. A cam ring (48) is directly connected to the output member and a stopper ring (42) is connected to the lock-up plate; a follower ring (50) includes cam followers that engage cam surfaces on the cam ring and further includes lock segments thereon that engage a spring diaphragm (60) which seals the damping chamber and which is shifted by the follower ring upon relative rotation between the input member and the output member to vary the volume of the variable volume chamber; the torsion damper includes orifices (68) and a relief valve (72) on the lock-up plate for controlling flow into and from the damping chamber to impose a vibration damping force between the input and output member partly in accordance with the size of the orifices; partly in accordance with the shape of the cam surface on the cam ring and partly in accordance with the spring rate of the spring diaphragm any one of which can be adjusted for tuning the torsional damping rates of the torsion damper.

15 Claims, 3 Drawing Sheets

5,070,974

HYDRAULIC TORSIONAL VIBRATION DAMPER

FIELD OF THE INVENTION

This invention relates to a lock-up clutch utilized in a hydrodynamic torque converter to provide a direct drive between the impeller and turbine of the torque convertor to improve the fuel efficiency of a vehicle transmission.

BACKGROUND OF THE INVENTION

It is recognized that fuel efficiency in a vehicle transmission can be improved by the provision of a lock-up clutch operable to directly connect the input of a hydrodynamic torque converter to the output thereof. In the past the typical lock-up clutch included a piston or clutch lock-up plate interposed between the forward wall of the converter. The forward wall is part of a rotatable housing driven by the output shaft of the engine and constitutes the input of the torque converter. The piston plate in turn is operatively connected to the transmission input shaft through the turbine hub of the converter which constitutes a clutch output member. In the past a vibration damper has been inserted between the piston plate and the turbine hub to dampen any torsional vibration occurring from the vehicle engine or other driving source such as the vehicle wheels when the vehicle acts to drive the engine when the torque converter or hydrodynamic converter and the transmission are in a coast mode.

Prior vibration dampers have included a clutch driven plate and a spring retainer plate secured together in spaced relation to receive a plurality of damper springs in windows formed between the spring retainer plate and a hub flange. As shown in U.S. Pat. No. 4,188,805, the damper assembly includes a hub with at least two radial arms, drive input means connected to the piston plate and axially aligned with the hub arms are floating equalizers journaled on the hub and having oppositely disposed arms, and damper springs positioned between the hub arms and equalizer arms; the drive input means being located in the path of the damper springs. Other mechanical spring dampers are shown in U.S. Pat. Nos. 4,139,995; 4,188,805; 4188,806; 4,232,534; 4,279,132; 4,302,951; 4,304,107; 4,333,552; 4,347,717; 4,360,352; 4,413,711; 4,427,400; 4,430,064; 4,451,244 and Re. 32,705; 4,530,673; 4,555,009; 4,585,427; 4,679,678; and 4,702,721 all owned by the assignee of the present invention.

While suitable for their intended purpose each of the dampers shown in the aforesaid patents require elaborate fixturing for assembly and involve use of a large number of spring components to provide a wide range of damping characteristics over various travel distances required for a particular coupling arrangement.

The present invention provides a simplified vibration damper assembly which relies upon hydraulic flow restriction to produce damping forces for controlling vibrations between the input member and output member of a hydrodynamic converter, e.g., the rotary housing of a converter which connects to the output shaft of a drive engine and an output hub of the converter which is adapted to be connected to the input shaft of a transmission for driving the output wheels of a vehicle.

SUMMARY OF THE INVENTION

The present invention provides an easily assembled low cost damper assembly for damping vibrations between the input member and an output member of a torque converter by a hydraulic damper that produces the damping force and dissipates the damping force by use of hydraulic flow across flow restriction orifices.

A feature of the present invention is the provision of a self-contained hydraulic damper assembly on the inboard surface of the clutch piston or lock-up plate. The hydraulic damper assembly has a control orifice communicating with a variable volume damping chamber formed in part by a spring diaphragm and in part by a series of ring members; one of which is connected to the lock-up plate and another of which is connected to the hub member and wherein a third ring member is arranged to be driven axially in response to relative rotation between the lock-up plate and the hub member to move the spring diaphragm so as to vary the volume of the damping chamber to cause flow of fluid across the flow restriction orifices to impose a damping force in the drive train to reduce undesirable drive line vibrations such as impact loads, pulsations, noises and the like in the transmission and driveline of a vehicle during operation of the vehicle.

A further feature of the invention is to reduce such vibrations by a damper assembly in which the spring diaphragm includes a stack of tunable belleville springs which are arranged to seal between the lock-up plate and the stacked rings.

A further feature of the present invention is to provide a damper assembly which can be tuned by adjusting the size of flow orifices; by adjusting the rate of the diaphragm spring; or by adjusting the slope of cam surfaces formed on one of the rings.

A further feature of the present invention is to provide such a hydrodynamic convertor damping mechanism wherein the spring diaphragm is an annular spring plate having a radially inner and a radially outer edge; the radially inner edge sealingly connected to the inboard surface of the lock-up plate and wherein means are provided for sealingly connecting the radially outer edge of the lock-up plate for movement with respect to the lock-up plate for varying the volume of the variable volume chamber.

A still further feature of the present invention is to provide such a hydrodynamic converter damping mechanism wherein the hydraulic damping assembly includes a variable volume liquid filled damping chamber rotatably supported on the inboard surface of the lock-up plate and includes a series of rings and a moveable diaphragm for sealing the damping chamber against fluid leakage from the fluid pressure in the hydrodynamic converter.

Another feature of the present invention is a hydraulic damping means which includes a variable volume liquid filled damping chamber rotatably supported on the inboard surface of a lock-up plate and the assembly having a moveable diaphragm for sealing the damping chamber against fluid leakage from the fluid pressure in the hydrodynamic converter and further having fluid restriction orifices in the lock-up plate for flow of damping fluid from a relief chamber into the variable volume liquid filled damping chamber for imposing a hydraulic damping force on the lock-up plate during a first relative rotation between the input member and the output member of a hydrodynamic converter.

A still further feature of the present invention is a relief valve on the lock-up plate for exhausting liquid from the damping chamber when the output member is rotated in an opposite direction with respect to the input member.

Further objects of the invention are to simplify the construction, efficiency and economy of damper assemblies utilized in a clutch assembly in the drive train between an automotive engine whether used between the input and output of a clutch or whether used between the rotatable housing of a hydrodynamic converter and the impeller hub output therefrom; and such further objects, advantages and capabilities as set-forth in the appended description and shown in the accompanying drawings.

DESCRIPTION OF A PREFERRED EMBODIMENT

Figure 1:
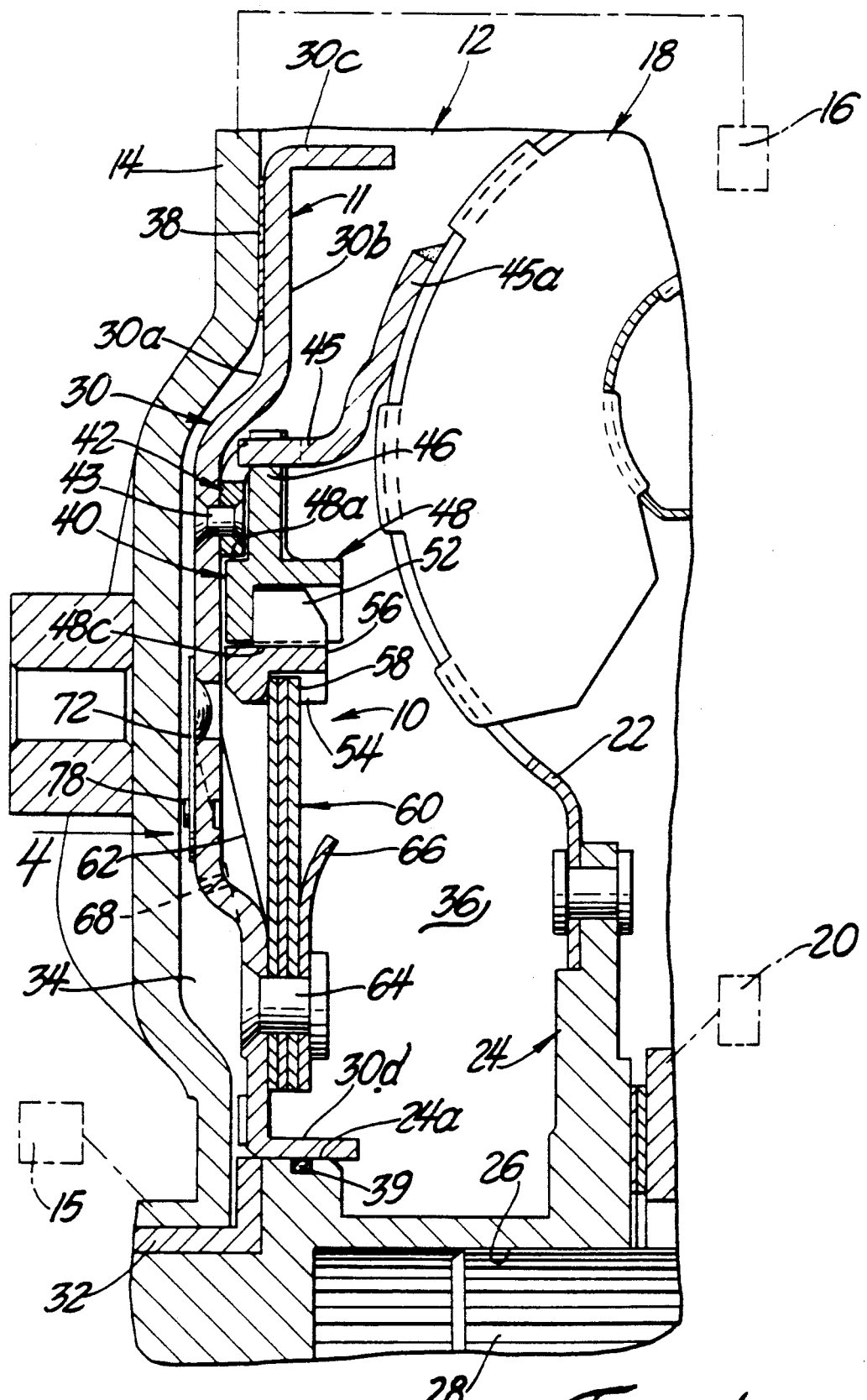
FIG. 1 is a fragmentary sectional view of a hydrodynamic converter including a hydraulic damper assembly in accordance with the present invention.

Referring more particularly to the disclosure in the drawings wherein an illustrative embodiment is shown, FIG. 1 discloses a hydraulic damper assembly 10 of the present invention shown in conjunction with a speed responsive lock-up coupling 11 of a torque converter or hydrodynamic converter 12. The converter 12 has a housing 14 driven by a vehicle engine 15. The housing 14 is secured to an impeller 16 connected to the housing 14. A turbine 18 and stator 20 are provided to receive flow from the impeller. The turbine 18 and stator 20 are conventionally arranged within the housing 14 to provide torque multiplication for an associated automatic transmission. The inner periphery of the turbine shell 22 is secured to a turbine hub 24 having an inner splined surface 26 which receives the splined end 28 of a transmission input shaft.

A rotatable lock-up plate 30 is positioned between the front face of the housing 14 and the damper assembly 10. A thrust washer 32 is positioned on the small diameter end of the turbine hub 24 between the housing 14 and the damper assembly 10 to provide a bearing surface therefor.

The lock-up plate 30 has an outboard surface 30a and an inboard surface 30b. The outboard surface 30a faces in the direction of a relief space 34 in which hydraulic pressure is controlled by suitable transmission controls. The inboard surface 30b faces in the direction of chamber 36 of the torque converter in which fluid pressure is always present during operation of the torque converter.

The lock-up plate 30 carries an annular ring 38 of friction material inboard of an outer axially directed flange 30c on the plate 30 which is directed axially inwardly of the chamber 36. The radially innermost part of the lock-up plate is formed as an axially directed flange 30d that is slidably supported on an annular surface 24a of the turbine hub 24. An O-ring seal 39 is located in the annular surface 24a for sealing against leakage between the relief space 34 and the chamber 36. When the clutch is locked up by engagement of the annular friction ring 38 and the housing 14 at the inboard surface 14a thereof the relief space 34 is sealed from the chamber 36.

Figure 3:
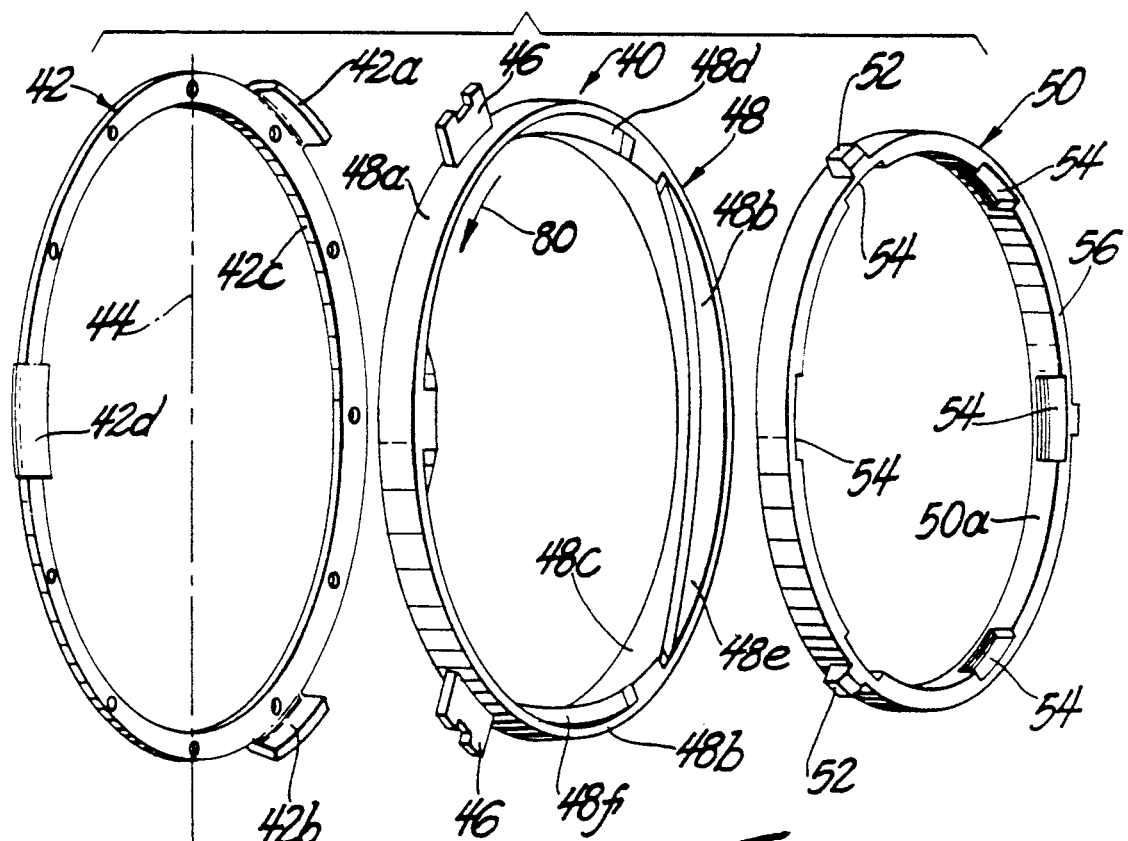
FIG. 3 is an exploded view of stacked ring components used in the hydraulic damper assembly of the present invention.
Figure 4:
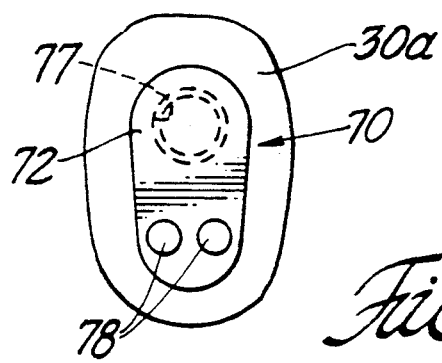
FIG. 4 is an elevational view of a relief valve assembly in the hydraulic damper of the present invention looking in the direction of the arrow 4 in FIG. 1.

In accordance with certain principles of the present invention, the damper assembly 10 is comprised of three stacked rings 40. The three stacked rings 40 include a stopper ring 42 secured to the inboard surface 30b by a plurality of circumferentially spaced rivets 43 one of which is shown in FIG. 1. As best shown in FIG. 3, the stopper ring 42 has three tabs 42a, 42b, 42d formed integrally thereof. The tabs 42a, 42b, 42d are angularly offset from the vertical centerline 44 of the ring 42 to define stops at extremes of relative rotation between the lock-up plate 30 and the output defined by the turbine hub 24.

One feature of the present invention is that the damper assembly 10 is connected to the torque converter output hub 24 by a plurality of circumferentially spaced drive tabs 45 one of which is shown in FIG. 1. The drive tabs 45 are welded at one end 45a to the outer shell 22 of the turbine 18 and are connected to radially outwardly directed lugs 46 on a cam ring 48 of the three stacked rings 40. The cam ring 48 has an outer peripheral surface segment 48a which sealingly engages a radially inwardly located annular surface 42c of the stopper ring 42 to seal therebetween. At rest pressure in chambers 34, 36 is equal and a spring diaphragm 60, described below, acts on cam ring 46 at inboard surfaces 48b thereon to hold the cam ring 48 within the stopper ring 42 so as to maintain the seal at surfaces 42c and 48 a. The cam ring 48 further includes a radially inwardly located annular sealing surface 48c that slidably sealingly receives a follower ring 50.

The cam ring 48 includes three circumferentially spaced cam surfaces 48d, 48e, 48f. The follower ring 50 has three circumferentially spaced follower tabs 52 that engage the surfaces 48d-48f. The surfaces 48d-48f are sloped in a direction to cause the follower ring 50 to be shifted axially outwardly of the cam ring 48 upon relative rotation between the cam ring 48 and the follower ring 50.

The follower ring 50 also has a plurality of circumferentially spaced retainer pockets 54 formed in the inboard face 56 thereof to form seats for tabs 58 formed at circumferentially spaced locations of a spring diaphragm 60 which connects to the stacked rings 40 to form a variable volume liquid filled and sealed damping chamber 62 between the rings 40, the lock-up plate 30 and the diaphragm 60.

Figure 2:
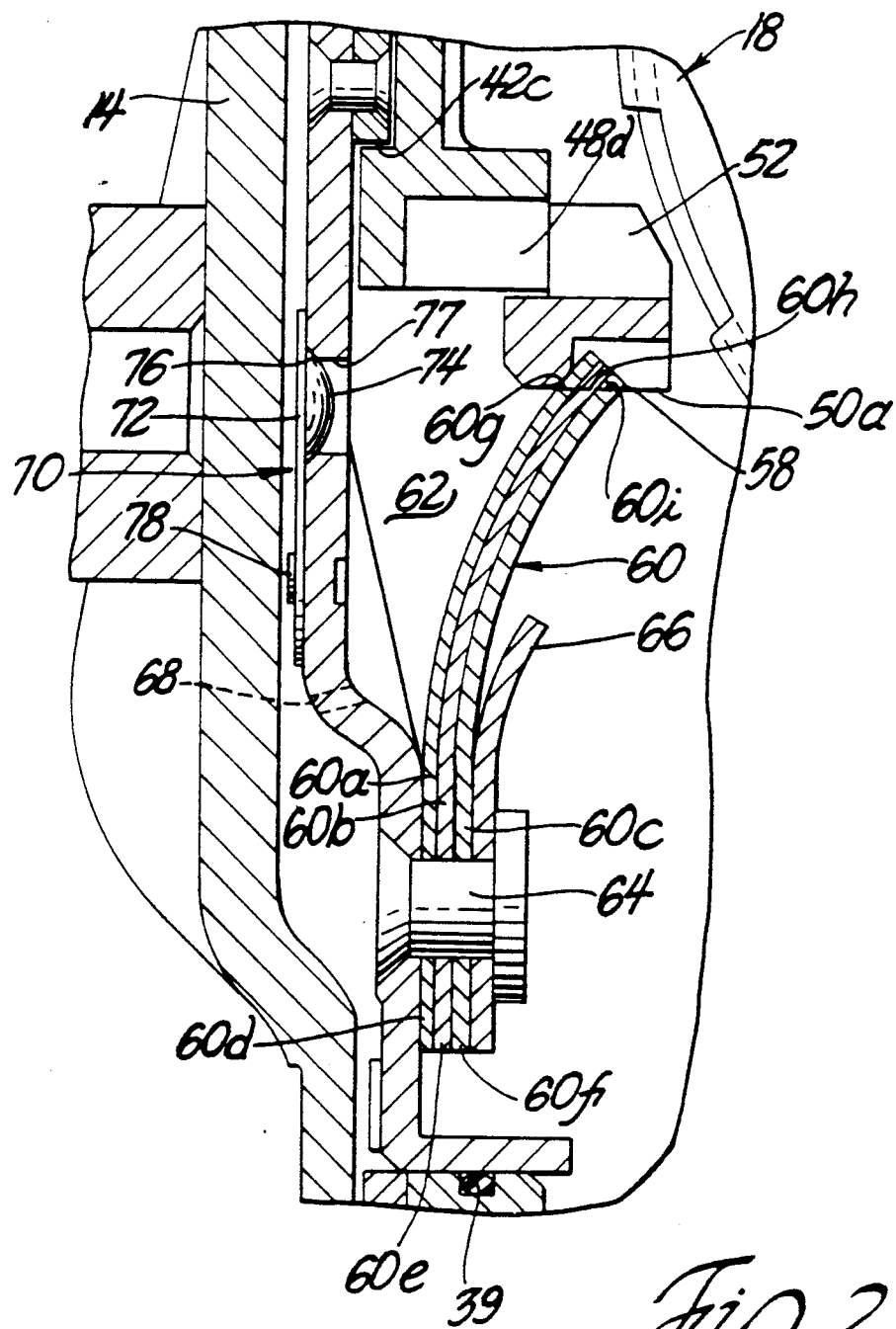
FIG. 2 is a fragmentary sectional view of a cam follower ring shown in a second operative position.

The spring diaphragm 60 more particularly includes three separate belleville springs 60a-60c each having a radially inwardly located edge 60d-60f held in sealed engagement with the inboard surface 30b of the lock-up plate 30 by a rivet 64 at a point slightly radially outwardly of the flange 30d as best shown in FIGS. 1 and 2. At the start of damping the belleville springs 60a-60c are arranged generally parallel to the lock-up plate 30 as seen in FIG. 1. A curved spring support plate 66 is held by rivet 64 to support the spring diaphragm 60 in a stressed position as shown in FIG. 2. The springs 60a-60c also include radially outer annular edges 60g-i which seal against an annular sealing surface 50a on the follower ring 50 at the inside diameter thereof. The liquid flow into the damping chamber 62 is controlled by restriction orifices 68 formed in the lock-up plate 30. Relief flow from the damping chamber 62 is through a relief valve 70 shown in FIG. 2. The relief valve 70 includes a spring element 72 with a hemispherically shaped valve element 74. The valve element 74 engages a seat 76 when the spring element 72 is biased closed to prevent flow from the relief chamber 34 into the damping chamber 62 through a relief port 77. Rivets 78 secure the end of the spring element 74 to the outboard surface 30a.

In operation the clutch 11 is engaged when pressure is reduced is the relief chamber 34 as for example when an associated transmission control (not shown) is placed is high drive3. At this point it is desirable to directly couple the engine output to the input shaft 28 to the transmission and the reduced pressure in relief chamber 34 will produce a pressure differential across the lock-up plate 30 which will force the lock-up plate 30 toward the front face of housing 14. As the friction lining 38 engages the housing 14 a differential motion occurs between the lock-up plate 30 with the output hub movement overriding that of the lock-up plate 30. As a consequence the drive tabs 45 will shift the cam ring 48 in the direction of the arrows 80 in FIG. 3. As the cam ring 48 shifts it shifts the follower ring 50 against the biasing force of the diaphragm spring 60 to move the diaphragm spring 60 from the position shown in FIG. 1 to the position shown in FIG. 2. Since the diaphragm spring 60 is sealed with respect to the rings 40 and the rings 40 are sealed relative to one another the damping chamber 62 increases in volume as fluid flows through the restriction orifices 68. The size of the orifices 68 is selected to provide a resistance to flow into the damping chamber 62 to produce a damping force on the follower ring 50 as the cam ring 48 and surfaces 48d–48f thereon shifted angularly. Such movement causes the follower tabs 52 to move outwardly on the cam surfaces 48d–48f and this in turn causes the follower ring 50 be shifted axially of the cam ring 48. The damping force counters the vibration and other engine noise otherwise transmitted from the input 14 through the locked lock-up plate 30 thence through the stacked rings 40 to the output represented by the turbine hub 24.

The damping force imposed between the input and output in part is established by the spring rate of the belleville springs 60a–60c as they are bent into the position shown in FIG. 2. The damping force also is in part established by the rate of flow through the restriction orifices 68. Finally the damping force can be further tuned by varying the slope of the cam surfaces 48d–48f. Damping force can thereby be easily turned by selecting a particular spring set, orifice size or cam surface profile depending upon the requirements of a given application.

The axial displacement of the rings 40 is shown in FIG. 2. It causes the sealed oil filled damping chamber 62 to be displaced axially. The contribution of the displaced hydraulic chamber to energy absorption characteristics of the hydraulic damper assembly 10 is a direct function of the volumetric rate of change of the chamber 62 and the calibration of the restriction orifices 68 for controlling oil flow into the chamber as it expands.

On reverse relative rotation of the output (the turbine hub 24) relative to the input (the lock-up plate 30 or housing 14) which can occur on idle when the drive wheels tend to drive the engine. Under these conditions, the damping force should be minimal and in accordance with the invention is accomplished by use of the relief valve 72 which will dump the liquid in the chamber 62 as the input is driven to cause the follower ring 50 to move inwardly of the cam ring 50 so as to increase the pressure in the damping chamber 62. Such an increase in pressure will cause the valve 72 to open so that liquid can flow from the damping chamber without passing through the orifices 68. The springs 60 will force the liquid from the chamber and will return from the flexed position shown in FIG. 2 to the unstressed neutral position shown in FIG. 1.

The advantages of the invention are that the axial travel of the follower ring will enable a wide angular excursion to take plate between the input and output members. The use of flow restriction maximizes calibration flexibility since desired damping can be accomplished merely by changing or adjusting hole size rather than a number of coil spring sizes as in prior hydrodynamic converter damper assemblies.

The arrangement is easily assembled and has only a few parts to minimize system complexity. The use of belleville springs improves the durability of the damper assembly and the damping orifices are essentially static devices which do not wear.

Another feature of the present invention is that the working fluid of the torque converter also serves as the medium for coupling the fluid damper assembly between the input and the output.

The illustrated arrangement provides an improved ability to isolate engine and or drivetrain induced torsional vibration and/or vehicle operator induced transient torque fluctuations.

Furthermore, while shown in association with a hydraulic torque converter, the invention is equally applicable to a vehicle clutch, a torsion coupling and a lock-up clutch in a torque converter.

While one embodiment of the invention has been described in detail herein, those familiar with the art to which this invention relates will recognize alternative designs and embodiments for practicing the invention as defined by the following claims.

What is claimed is:

1. A hydraulic converter damping mechanism for damping engine vibrations in a vehicle drive train when a lock-up plate, having inboard and outboard surfaces, is engaged with a rotatable converter input housing of the hydrodynamic converter for directly coupling the rotatable housing to an output member of the hydrodynamic converter as a hydraulic pressure differential is applied across the inboard and outboard surfaces of the lock-up plate from a high pressure chamber on one side of the lock-up plate to a relief chamber on the opposite side of the lock-up plate which relief chamber is selectively connected to a sump of a hydraulic supply which is connected to the hydrodynamic converter for charging the high pressure chamber, said damping mechanism comprising:

a hydraulic damping means including a liquid filled variable volume chamber for imposing a vibration damping force on said lock-up plate for damping engine vibrations between said input member and said output member as the lock-up plate engages said input member and wherein the variable volume chamber includes a wall portion formed by an annular spring plate which absorbs engine vibrations and functions as moveable diaphragm for varying the volume of said variable volume chamber;

fluid restriction means for controlling flow of liquid into and from said variable volume chamber in accordance with the rate of relative rotation between said input member and said output member of said hydrodynamic converter so as to control the level of damping torque on said lock-up plate in accordance with the relative movement between said input member and said output member.

2. The hydrodynamic converter damping mechanism of claim 1, wherein said hydraulic damper means includes a stopper ring connected to said lock-up plate;

cam means carried by said stopper ring relatively rotated with said output member and follower means relatively fixed to said lock-up plate and shifted by said cam means for varying the volume of said variable volume chamber so as to cause flow of damping fluid through said fluid restriction means for damping relative movement between said input member and said output member in accordance with changes in velocity produced upon relative rotation between said input member and said output member.

3. The hydrodynamic converter damping mechanism of claim 2, wherein said annular spring plate has a radially inner and a radially outer edge; said radially inner edge sealingly connected to the inboard surface of said lock-up plate and means for sealingly connecting said radially outer edge of said annular spring plate for movement with respect to said lock-up plate for varying the volume of said variable volume chamber.

4. The hydrodynamic converter damping mechanism of claim 1, wherein said variable volume liquid filled damping chamber is disposed on the inboard surface of said lock-up plate;

said fluid restriction means including orifice means in said lock-up plate for controlling flow of damping fluid from said relief chamber to said variable volume liquid filled damping chamber for imposing a hydraulic damping force on said lock-up plate during rotation thereof relative to said input member of said hydrodynamic converter.

5. The hydrodynamic converter damping mechanism of claim 1, wherein said fluid restriction means includes orifice means in said lock-up plate for controlling flow of damping fluid from said relief chamber into said variable volume liquid filled damping chamber for imposing a hydraulic damping force on said lock-up plate during a first relative rotation between said input member and said output member of said hydrodynamic converter; and said hydraulic damping mechanism further includes relief valve means on said lock-up plate for exhausting liquid from said damping chamber when said output member is rotated in an opposite direction with respect to said input member.

6. The hydrodynamic converter damping mechanism of claim 1, wherein said annular spring plate has a radially inner and a radially outer edge; said radially inner edge sealingly connected to the inboard surface of said lock-up plate and means for sealingly connecting said radially outer edge of said annular spring plate for movement with respect to said lock-up plate for varying the volume of said variable volume chamber.

7. The hydrodynamic converter having an input member and an output member;

damping means for connecting said input member and said output member in direct drive relationship;

said damping means including a lock-up plate with an inboard and an outboard surface and means for imposing hydrodynamic convertor pressure on the inboard surface for moving said lock-up plate in a direction to be coupled to said input member;

means carried by said output member engageable with said damping means for operating said damping means upon relative rotation between said input member and said output member in a first direction;

said damping means including a spring diaphragm connected to said lock-up plate for forming a sealed fluid filled damping chamber on the inboard surface thereof;

cam means carried by said lock-up plate and cam follower means responsive to relative rotation between said input member and said output member to shift said spring diaphragm to vary the volume of said damping chamber and to absorb torsional vibrations; and fluid restriction means for controlling flow of liquid from a liquid source to said damping chamber in accordance with the relative velocity of said input and output members for imposing a force on said lock-up member to damp relative rotation between said input member and said output member as said lock-up member is directly coupled to said input member.

8. The hydrodynamic converter damping mechanism for damping engine vibrations in a vehicle drive train when a lock-up plate is engaged with a rotatable convertor input housing of the hydrodynamic converter for directly coupling the rotatable housing to an output member of the hydrodynamic converter as a hydraulic pressure differential is applied across the inboard and outboard surfaces of the lock-up plate to a relief chamber on the opposite side of the lock-up plate which relief chamber is selectively connected to a sump of a hydraulic supply which is connected to the hydrodynamic converter for charging the high pressure chamber, said damping mechanism comprising:

hydraulic damping means including means forming a liquid filled variable volume chamber for imposing a vibration damping force on said lock-up plate for damping engine vibrations between said input member and said output member as the lock-up plate engages said input member;

said means forming said variable volume chamber including a first ring on said lock-up plate having a radially inwardly located sealing surface formed circumferentially thereof; a second ring having an annular shoulder supported within said sealing surface and further including a radially inwardly located cam surface thereon;

means for connecting said second ring for rotation with said output member;

a third ring supported within said second ring and coacting sealing surfaces on said third ring and said second ring for sealing therebetween; said third ring having cam follower tabs thereon engageable with said cam surface of said second ring for causing said third ring to shift axially of said second ring upon relative rotation between said input member and said output member; and fluid restriction means for controlling flow of liquid into and from said variable volume chamber in accordance with the rate of relative rotation between said input member and said output member of said hydrodynamic converter so as to control the level of damping torque on said lock-up plate in accordance with the relative movement between said input member and said output member.

9. The hydrodynamic converter damping mechanism of claim 8, wherein said hydraulic damper means includes a moveable diaphragm forming part of said variable volume chamber.

10. The hydrodynamic converter damping mechanism of claim 9, wherein said moveable diaphragm is an annular spring plate having a radially inner and a radially outer edge; said radially inner edge sealingly connected to the inboard surface of said lock-up plate and means for sealingly connecting said radially outer edge of said annular spring plate for movement with respect to said lock-up plate for varying the volume of said variable volume chamber.

11. The hydrodynamic converter damping mechanism of claim 10 wherein said fluid restriction means includes orifice means in said lock-up plate for flow of damping fluid from said relief chamber into said variable volume liquid filled damping chamber for imposing hydraulic damping force on said lock-up plate during a first relative rotation between said input member and said output member of said hydrodynamic converter.

12. The hydrodynamic converter damping mechanism of claim 11 further including relief valve means on said lock-up plate for exhausting liquid from said damping chamber when said output member is rotated in an opposite direction with respect to said input member.

13. A damping mechanism for damping engine vibrations in a vehicle drive train between an input member and an output member comprising:
a hydraulic damping mechanism including an annular spring plate forming a wall portion of a liquid filled variable volume chamber for imposing a vibration damping force between said input member and said output member for damping engine vibrations between said input member and said output member; and
fluid restriction means for controlling flow of liquid into and from said variable volume chamber in accordance with the rate of relative rotation between said input member and said output member so as to control the level of damping torque on a lockup plate in accordance with the relative movement between said input member and said output member.

14. The damping mechanism of claim 13, wherein said hydraulic damper means includes a stopper ring;
cam means carried by said stopper ring relatively rotated with said output member and follower means relatively angularly fixed with respect to said stopper ring and axially shifted by said cam means for varying the volume of said variable volume chamber so as to cause flow of damping fluid through said fluid restriction means for damping relative movement between said input member and said output member in accordance with changes in velocity produced upon relative rotation between said input member and said output member.

15. The damping mechanism of claim 13, wherein said annular spring plate has a radially inner edge and a radially outer edge; said radially inner edge sealingly connected to said lock-up plate and means for sealingly connecting said radially outer edge of said annular spring plate to said lock-up plate for movement with respect to said input member for varying the volume of said variable volume chamber.

* * * * *